(12) United States Patent
Noonan et al.

(10) Patent No.: US 7,197,427 B2
(45) Date of Patent: Mar. 27, 2007

(54) METHOD FOR RISK BASED TESTING

(75) Inventors: Scott Alan Noonan, Lynchburg, VA (US); Raymond Matthew Gombos, Lynchburg, VA (US); Diane Marie Russell, Lynchburg, VA (US); Mary Kathryn Bryant, Forest, VA (US); Michael David Metzger, Lynchburg, VA (US); Timothy Patrick Jon Perry, Lynchburg, VA (US)

(73) Assignee: Genworth Financial Inc., Richmond, VA (US)

( * ) Notice: Subject to any disclaimer, the term of this patent is extended or adjusted under 35 U.S.C. 154(b) by 428 days.

(21) Appl. No.: 10/812,955

(22) Filed: Mar. 31, 2004

(65) Prior Publication Data

US 2005/0246207 A1    Nov. 3, 2005

(51) Int. Cl.
*G06F 19/00* (2006.01)
(52) U.S. Cl. .......................................... 702/179; 714/25
(58) Field of Classification Search ................ 702/179, 702/181, 182–185, 188; 714/25
See application file for complete search history.

(56) References Cited

U.S. PATENT DOCUMENTS

| | | |
|---|---|---|
| 5,402,363 A | 3/1995 | Siebert |
| 5,556,759 A | 9/1996 | Beach |
| 5,822,585 A | 10/1998 | Noble et al. |
| 5,878,420 A | 3/1999 | de la Salle |
| 5,949,972 A | 9/1999 | Applegate |
| 6,006,263 A | 12/1999 | Horwitz |
| 6,016,466 A | 1/2000 | Guinther et al. |
| 6,025,149 A | 2/2000 | Cuckle et al. |
| 6,031,990 A | 2/2000 | Sivakumar et al. |
| 6,035,426 A | 3/2000 | Applegate |
| 6,113,538 A | 9/2000 | Bowles et al. |
| 6,130,042 A | 10/2000 | Diehl et al. |
| 6,144,961 A | 11/2000 | de la Salle |

(Continued)

*Primary Examiner*—Edward Raymond
(74) *Attorney, Agent, or Firm*—Hunton and Williams LLP

(57) ABSTRACT

The invention relates to a risk based testing method. The risk based testing method comprises defining a process or system to be tested, identifying a plurality of risks associated with the process or system, quantifying each of the risks with a risk value, defining a test plan for the process or system, the test plan including a number of test cases, wherein testing of the test cases is prioritized based on the risk value, and executing the test plan. The invention also relates an article of manufacture. The article of manufacture comprises a computer useable medium having computer readable program code means embodied therein for testing a process or a system. The computer readable program code means in the article of manufacture comprises: computer readable program code means for causing the computer to receive and store data identifying a plurality of risks associated with the process or system; computer readable program code means for causing the computer to receive and store a risk value associated with each of the plurality of risks; computer readable program code means for causing the computer to receive and store data defining a test plan for the process or system, the test plan including at least one test case, the at least one test case comprising at least one step; computer readable program code means for causing the computer to receive and store data associating each of the plurality of risks with a step of a test case; and computer readable program code means for causing the computer to generate a report listing the risks in order of the risk value.

35 Claims, 8 Drawing Sheets

U.S. PATENT DOCUMENTS

| | | |
|---|---|---|
| 6,182,146 B1 | 1/2001 | Graham-Cumming, Jr. |
| 6,186,677 B1 | 2/2001 | Angel et al. |
| 6,219,050 B1 | 4/2001 | Schaffer |
| 6,219,829 B1 | 4/2001 | Sivakumar et al. |
| 6,311,166 B1 | 10/2001 | Nado et al. |
| 6,314,558 B1 | 11/2001 | Angel et al. |
| 6,332,213 B1 | 12/2001 | Grossman et al. |
| 6,334,144 B1 | 12/2001 | Horwitz |
| 6,393,480 B1 | 5/2002 | Qin et al. |
| 6,518,069 B1 | 2/2003 | Otvos et al. |
| 6,519,763 B1 | 2/2003 | Kaufer et al. |
| 6,521,415 B1 | 2/2003 | Pulido-Cejudo |
| 6,584,501 B1 | 6/2003 | Cartsonis et al. |
| 6,602,469 B1 | 8/2003 | Maus et al. |
| 6,618,682 B2 | 9/2003 | Bulaga et al. |
| 6,643,842 B2 | 11/2003 | Angel et al. |
| 6,649,743 B1 | 11/2003 | Pulido-Cejudo |
| 6,701,519 B1 | 3/2004 | Cowan |
| 2004/0102923 A1* | 5/2004 | Tracy et al. ................ 702/181 |

* cited by examiner

Bug Reporting and Tracking

Tester
- Identify/report suspected bugs. The bugs are entered into the bug tracking tool with a detailed description.
- Coordinate and check for duplication of bugs, redundant bugs where possible.
- Generate reports to review status of reported bugs for retesting as needed.

Troubleshooter/Business & Technical Support
- Generate a report of all reported bugs, validating against the design requirements.
- Coordinate with technical/business to locate source of the bugs and develop business solutions.
- Communicate to testers the status of reported bugs by updating bug status in the TEST SOFTWARE
- Verify reported bugs and set the initial severity, discovery category, original bug reason, and tester. If Applicable, owner, notes and screenshots may be included
- Coordinate the modification and development of rules, User Interfaces, form flows, workflow, and development of bug fixes.
- Provide update training procedures

Bug REVIEW
- Attended by testers, troubleshooters, and development.
- Review the analysis, business resolution, proper severity level and categorization of new bugs.
- Check the status of key bugs.
- Assign work.

Development Team
- Troubleshoot and fix bugs as assigned based on Bug Review Severity
- Unit test fixes and prepare code for integration.

Deployment Team
- Receive unit tested fixes ready for Integration.
- Change Bug Status to User Test when integration complete and new build is ready to test.
- Notify Tester and Submitter by email when any change or update is made and is ready to test.

Tester
- Tester will receive an email message when an update or status is made and is ready to test.
- Retest the bug.
- If retest is successful, update the bug tracking tool with resolution details and close the bug.
- If retest fails, reset bug status to rework and notify development.

| | Production vs. Model Office Comparison | | | | | | | |
|---|---|---|---|---|---|---|---|---|
| | Server | Region | Applications | Server Type | CPU | Int | FP | Memory | Disks |
| Server Role 1 | nm01 | Production | App 1 | Server Type 1 | 8 * 900 MHz | 3680 | 5040 | 16 GB | 6 * 72 GB |
| | nm02 | Production | App 2 | Server Type 1 | 8 * 900 MHz | 3680 | 5040 | 16 GB | 6 * 72 GB |
| | | | | | Total | 7360 | 10080 | | |
| | nm09 | Model | App 1 & 2 | Servet Type 3 | 2 * 750 MHz | 740 | 640 | 4 GB | 2 * 36 GB |
| | | | | | Total | 740 | 640 | | |
| | | | | | Difference | 9.95 | 15.75 | # of X larger | |
| Server Role 2 | nm03 | Production | App 3 | Server Type 3 | 2 * 750 MHz | 740 | 640 | 4 GB | 2 * 36 GB |
| | nm04 | Production | App 3 | Server Type 3 | 2 * 750 MHz | 740 | 640 | 2 GB | 2 * 36 GB |
| | nm05 | Production | App 3 | Server Type 3 | 2 * 750 MHz | 740 | 640 | 4 GB | 2 * 36 GB |
| | nm06 | Production | App 3 | Server Type 3 | 2 * 750 MHz | 740 | 640 | 4 GB | 2 * 36 GB |
| | | | | | Total | 2960 | 2560 | | |
| | nm10 | Model | App 3 | Server Type 3 | 2 * 750 MHz | 740 | 640 | 4 GB | 2 * 36 GB |
| | | | | | Total | 740 | 640 | | |
| | | | | | Difference | 4 | 4 | # of X larger | |
| Server Role 3 | nm07 | Production | App 4 | Server Type 2 | 2 * 900 MHz | 920 | 1260 | 4 GB | 6 * 72 GB |
| | nm08 | Production | App 4 | Server Type 2 | 2 * 900 MHz | 920 | 1260 | 4 GB | 6 * 72 GB |
| | | | | | Total | 1840 | 2520 | | |
| | nm11 | Model | App 4 | Server Type 2 | 2 * 900 MHz | 920 | 1260 | 4 GB | 6 * 72 GB |
| | | | | | Total | 920 | 1260 | | |
| | | | | | Difference | 2 | 2 | # of X larger | |

FIGURE 8

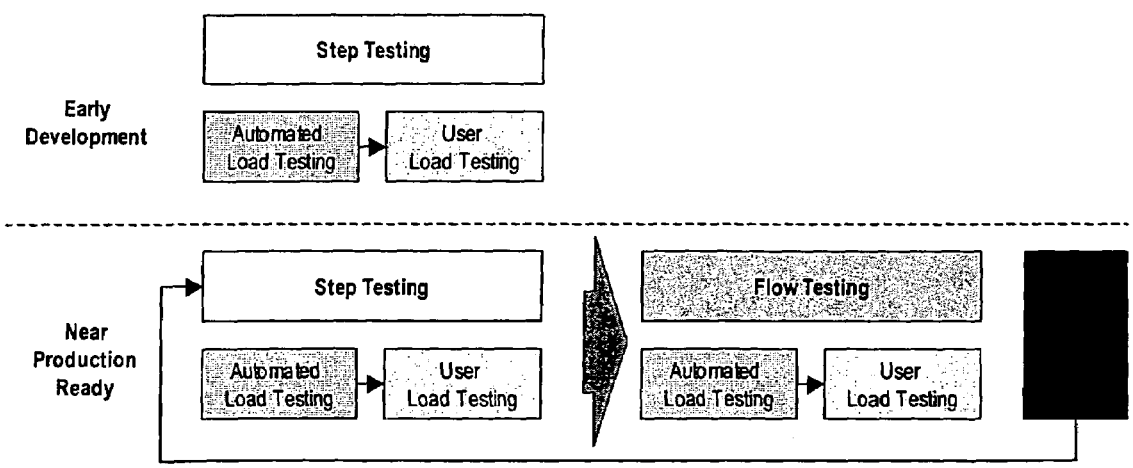

FIGURE 9

| Validation Testing | | | | | |
|---|---|---|---|---|---|
| Forms Submitted: 2016 | | | | | |
| Source | Start | End | Elapsed | Forms | Per minute |
| log.3 | 12:07:20 | 12:56:34 | 49 | 146 | 2.98 |
| log.2 | 12:56:41 | 15:32:49 | 154 | 502 | 3.26 |
| log.1 | 15:33:06 | 18:12:38 | 159 | 477 | 3.00 |
| log | 18:12:46 | 19:06:07 | 54 | 147 | 2.72 |
| | | | | | |
| Total Successful | | | | 416 | 1272 | 3.06 |
| | | | | | |
| Error queue | | | | 220 | |
| Retry queue | | | | 524 | |
| Forms Processed | | | | 2016 | |
| | | | | | |
| System | Model | CPUs | Integer | Floating Point | |
| nm01 | Server Type 1 | 8 * 900 MHz | 3680 | 5040 | |
| nm02 | Server Type 1 | 8 * 900 MHz | 3680 | 5040 | |
| | | | 7360 | 10080 | Total |
| nm03 | Server Type 2 | 4 * 900 MHz | 1840 | 2520 | |
| | | | 4 | 4 | Comparison (# of times faster Production should be) |
| | | | | 12.2 | Production estimate per minute (Comparison * per minute) |
| | | | | 10000 | Validations per day |
| | | | | 817.61 | Minutes to process |
| | | | | 13.63 | Hours to process |

FIGURE 10

| | 1 | 2 | 3 | 4 | 5 | 6 | 7 | 8 | 9 |
|---|---|---|---|---|---|---|---|---|---|
| | Type | # Per Day | Actual Model Performance | | Mod/Prod Capacity Difference* | Overhead** | Expected Production Performance | Actual Production Performance*** | |
| Transaction 1 | 240 | 35.15 | 8436.21 | 9.95 | 20% | 1059.83 | 12.98 | 3115.80 |
| Transaction 2 | 720 | 27.05 | 19479.17 | 9.95 | 20% | 2447.13 | 4.92 | 3541.67 |
| Transaction 3 | 400 | 20.56 | 8222.22 | 9.95 | 20% | 1032.94 | 2.25 | 898.69 |
| Transaction 4 | 800 | 93.05 | 74438.30 | 9.95 | 20% | 9351.55 | 9.97 | 7975.96 |
| Transaction 5 | 800 | 6.99 | 5595.82 | 9.95 | 20% | 702.99 | 2.68 | 2144.02 |
| Transaction 6 | 200 | 10.09 | 2017.20 | 9.95 | 20% | 253.42 | 6.44 | 1287.62 |
| Transaction 7 | 4000 | 118.61 | 474428.20 | 9.95 | 20% | 59601.53 | 21.61 | 86453.84 |
| Transaction 8 | 4000 | 157.55 | 630203.04 | 9.95 | 20% | 79171.24 | 10.42 | 41666.68 |
| Transaction 9 | 100 | 27.01 | 2700.62 | 9.95 | 20% | 339.27 | 1.91 | 191.06 |
| Transaction 10 | 200 | 23.32 | 4663.50 | 9.95 | 20% | 585.87 | 4.63 | 925.93 |
| | Total Seconds | | 1230184.28 | | | 154545.76 | | 148201.26 |
| | Total Hours | | 341.72 | | | 42.93 | | 41.17 |
| * Calculated from SpecINT ratings | ** Estimated additional overhead | | *** Improvements resulting from load testing improved the actual system performance on certain transactions | | | | | | |

FIGURE 11

METHOD FOR RISK BASED TESTING

BACKGROUND

The present invention relates generally to testing, and more particularly to a method for testing a process or system based on risks associated with the process or system.

Traditional process and system testing generally focuses on two areas. The first area, referred to as functional testing, involves testing one or more specific functionalities of the process or system. Functional testing is conducted to determine whether the functions of the process or system work correctly. The second area, referred to as load testing, involves testing the amount of work a given process or system can accomplish. Load testing may address, for example, how many times each action in a process or system can be completed in a given time interval by the system. Load testing may also be used to determine whether a particular process or system has the capacity to effectively handle the expected volume of work.

Functional testing and load testing are typically conducted prior to the release of a system or process to ensure that the system/process will work correctly. The amount of effort involved in conducting functional and load testing, however, can be significant, particularly when every functionality of the process or system is tested. Furthermore, the cost of conducting functional and load testing of an entire system and process can be substantial in the case of a complex system or process. In some instances, the amount of work and the cost of conducting complete functional and load testing may not be justified.

Accordingly, it would be desirable to have a method for testing a process or system which, among other things, was more cost effective than traditional methods of functional and load testing.

SUMMARY

The invention relates to a risk based testing method for testing a process or a system. According to one embodiment of the invention, the risk based testing method comprises defining a process or system to be tested, identifying a plurality of risks associated with the process or system, quantifying each of the risks with a risk value, defining a test plan for the process or system, the test plan including a number of test cases, wherein testing of the test cases is prioritized based on the risk value, and executing the test plan.

The invention also relates an article of manufacture. According to an exemplary embodiment of the invention, the article of manufacture comprises a computer useable medium having computer readable program code means embodied therein for testing a process or a system. The computer readable program code means in the article of manufacture comprises: computer readable program code means for causing the computer to receive and store data identifying a plurality of risks associated with the process or system; computer readable program code means for causing the computer to receive and store a risk value associated with each of the plurality of risks; computer readable program code means for causing the computer to receive and store data defining a test plan for the process or system, the test plan including at least one test case, the at least one test case comprising at least one step; computer readable program code means for causing the computer to receive and store data associating each of the plurality of risks with a step of a test case; and computer readable program code means for causing the computer to generate a report listing the risks in order of the risk value.

BRIEF DESCRIPTION OF THE DRAWINGS

FIG. 2 is an example of a portion of a user interface for recording risks associated with a process or system being tested;

FIG. 3 is an example of a portion of a user interface for recording test cases;

FIG. 6 is an example of a method for reporting and tracking bugs;

FIG. 7 is an example of a portion of a user interface of a module for entry and management of bugs;

FIG. 8 is an example of data used to compare performance of a model system with performance of a production system;

FIG. 9 is a diagram showing an example of a testing method utilizing step testing, flow testing, automated load testing, and user load testing;

FIG. 10 is a table showing an example of data used to determine performance characteristics of a production system and a model system;

FIG. 11 is a table showing an example of data on the actual performance of a model system, expected performance of a production system, and actual performance of a production system.

DETAILED DESCRIPTION

The present invention relates to a method for conducting risk-based testing that can be utilized for testing a variety of systems and processes, such as business processes, manufacturing processes, and/or medical or surgical processes. An embodiment of the invention involving testing a process for issuing an insurance policy to an applicant will be described to illustrate various features and advantages of the invention. However, those skilled in the art will appreciate that the invention is not limited thereto.

Figure 1:
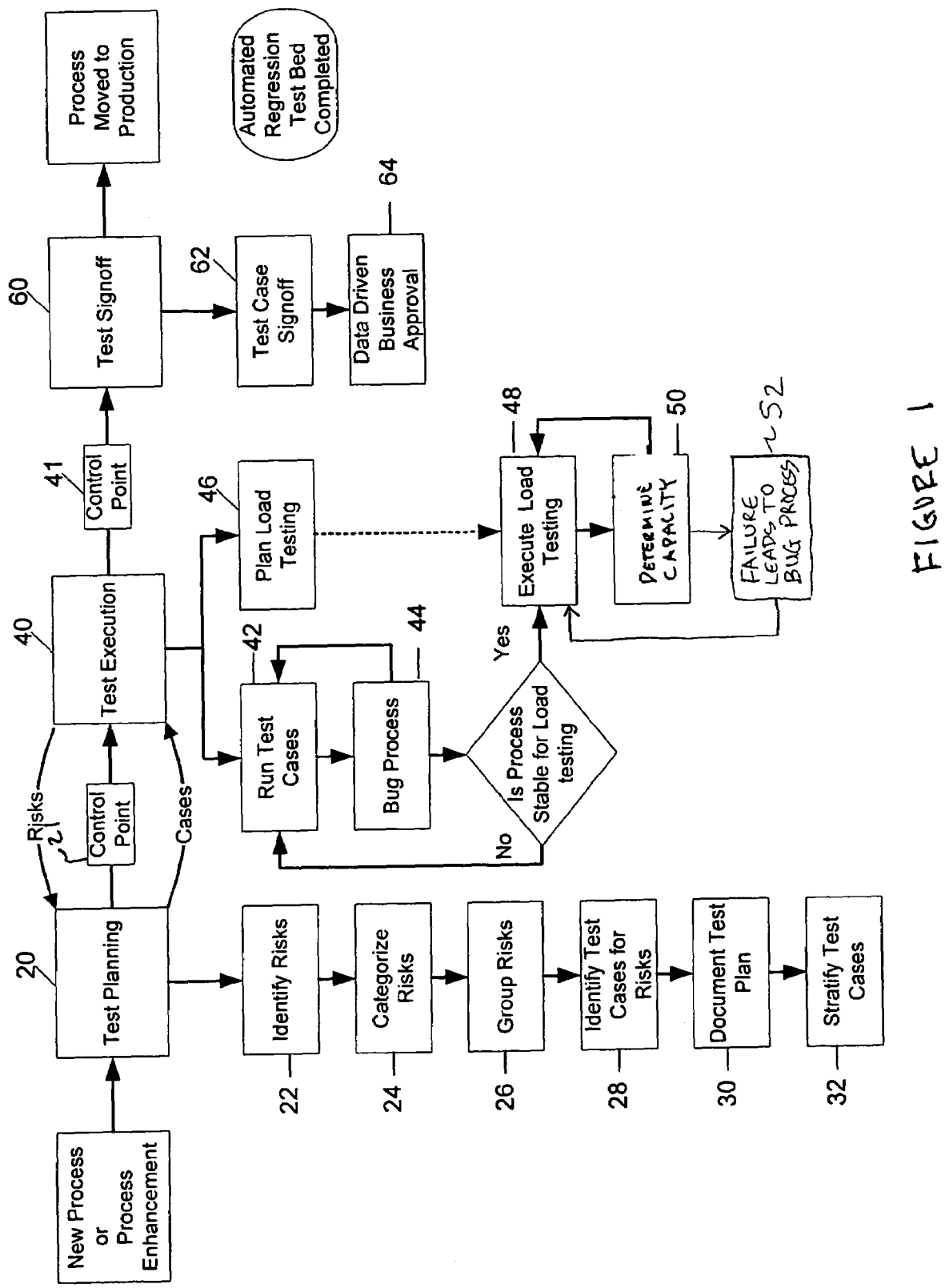
FIG. 1 is a diagram illustrating a risk-based testing method according to an exemplary embodiment of the invention.

FIG. 1 illustrates a method for risk-based testing. The method comprises a test planning phase, a test execution phase, and a test signoff phase. The method can be used to test a new process/system or a modified process/system comprising one or more manual and/or automated steps. One example of a process to be tested is an insurance application process in which an applicant provides information to an insurance provider, and the insurance provider processes the information and issues or declines to issue an insurance policy to the applicant. The process of issuing an insurance policy includes both manual steps, such as the applicant sending records and information to the insurance provider, and automated steps such as computer processing of the entered information to set the terms of the insurance policy. The automated steps are typically executed by a computer system maintained by the insurance provider. Testing of the process commonly includes testing the system which executes the process.

Figure 12:
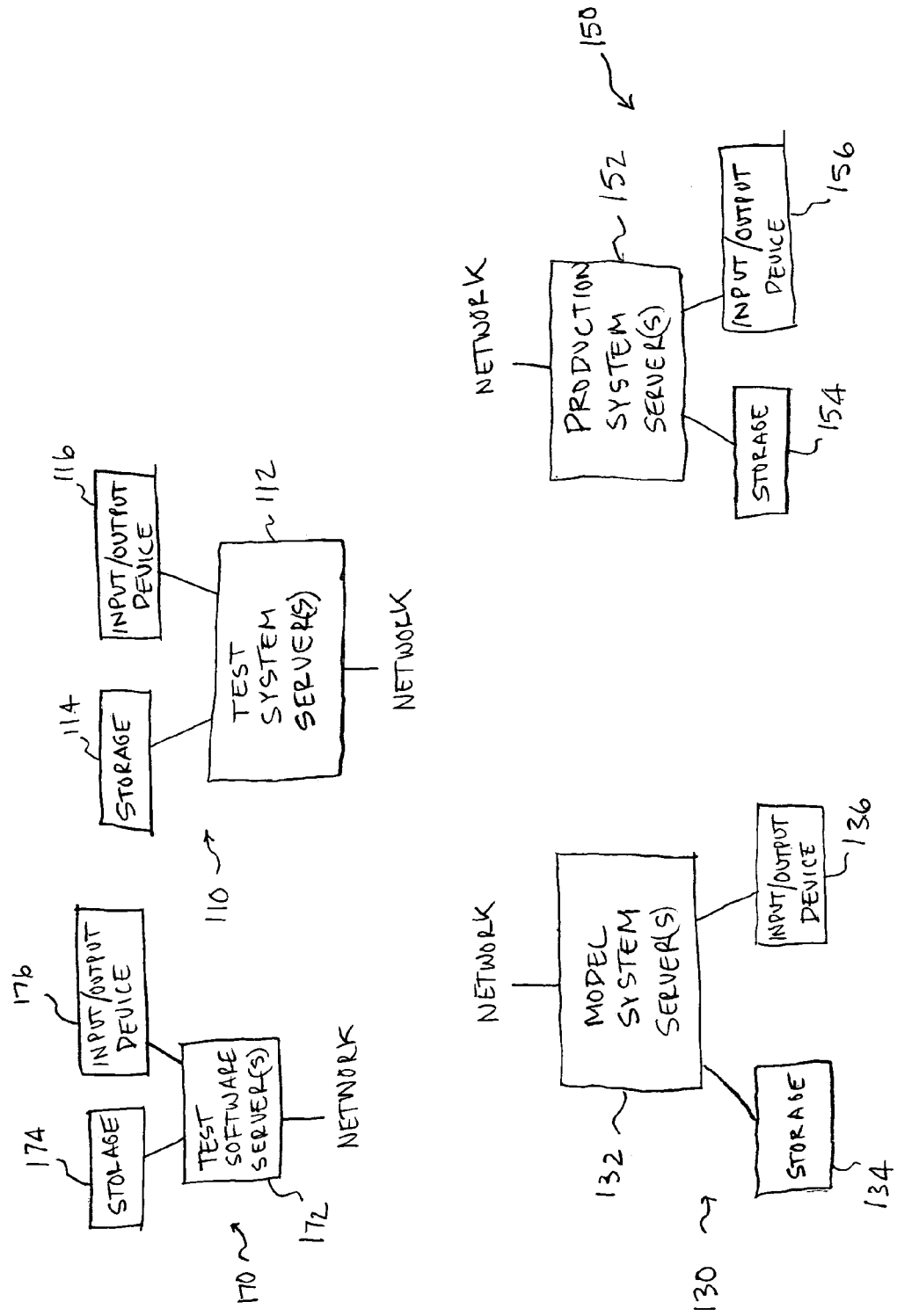
FIG. 12 is a diagram showing an example of a test system, a model system, a production system, and a test software server.

The risk-based method of testing may also include both manual and automated steps. The automated steps can be executed by a system, such as a computer system. For clarity, the process being tested will be referred to herein as the "process" or the "process being tested," and the method of testing will be referred to as the "method" or the "testing method." The risk-based testing method and the process being tested may be conducted using one or more systems. FIG. 12 illustrates an example of a test system 110, a model system 130, and a production system 150. In general, the testing of a process may begin on a smaller scale using a test system 110 of relatively low computing power. The testing progresses to a point where it is beneficial to use a model system 130 that more closely simulates the higher capacity computing environment of the production system 150. Ultimately, the process being tested is approved and released for use on the production system 150. The software used to execute the process being tested may be referred to as the application software. The application software typically resides on the servers 112, 132 and 152. The software used to execute the test method may be referred to as the test software. The test software typically resides on a test software server 172. Each of these systems 110, 130, 150 may be connected to a network such as a local area network (LAN) or a wide area network such as the Internet.

Referring to FIG. 1, a risk based testing method which can be used to test a new or modified process is illustrated. Risk based testing typically involves identifying the highest risks to implementation of a process or system being tested and focusing testing to mitigate those risks. Risks are categorized and reviewed at specified points in the testing method to determine when acceptable levels of risk are achieved and the process or system is ready for production use. In risk based testing, the focus is typically on which parts of the process or system represent the greatest risk to the desired outcome. By effectively testing risk to ensure the process or system works correctly and completely, the functionality and capacity of the process or system may be demonstrated.

As shown in FIG. 1, an example of a risk based testing method comprises a test planning phase 20, a test execution phase 40, and a test signoff phase 60. The test planning phase 20 includes a number of steps 22–32. The step 22 of identifying risks typically involves analysis, by one or more persons knowledgeable about the process/system being tested, of potential failures which may occur in carrying out the process or system. The step 24 of categorizing the risks typically entails assigning a risk value to each identified risk. The step 26 of grouping risks involves arranging together risks having similar risk values. The step 28 of identifying test cases entails defining a set of conditions for each of a number of test cases which are used as input for executing the process or system being tested. As one example, a test case may be a hypothetical person having defined physical attributes such as age, sex, weight, smoker, family history of cancer, etc. These conditions are used as input to a system executing a process that determines whether to issue an insurance policy to the hypothetical person, and the terms of the insurance policy. The step 30 of documenting the test plan involves recording the details of how the test plan is defined and executed. The step 32 of stratifying the test cases involves arranging risks and/or test cases according to complexity level. These steps will be described in more detail below.

The test execution phase 40 includes a number of steps 42–52 relating to executing the test using the test cases defined in the test planning stage 20 as input. The step 42 of running test cases involves executing the process or system being tested using the test cases as input. The step 44 involves tracking, correction and retesting of process or system errors, commonly referred to as "bugs." The step 46 involves identifying the risks of largest scale regarding system load and creating manual or automatic load tests to test those risks. Load testing is executed in step 48. In step 50, the capacity of the production system is determined, e.g., by statistical comparison of the performance of a model system with the performance of the production system. During the load testing, it is possible that bugs may be found in the software that need correction. In such case, step 52 is executed in which bugs discovered during load testing are corrected. After correction of bugs, load testing is re-executed in step 48.

The test signoff phase 60 includes step 62, in which a person responsible for testing presents the test cases, and a step 64 in which the results of testing are evaluated and approved. More specifically, the team responsible for the testing assesses the risks successfully tested, the risks that failed, and the risks that were not tested, and then based on a severity of each risk, presents the results to one or more business leaders who make a decision as to whether to approve the process or system. If the process is approved, then it is moved to the production system 150. At this point, an automated regression test bed has been completed. The automated regression test bed is a set of test cases that have been defined and executed and that can be reexecuted in the future as retesting is needed.

Having provided an overview of an example of the testing method, the steps depicted in FIG. 1 will now be described in further detail.

The first phase of risk based testing is test planning. In the test planning phase 20, the risks associated with implementation of the process to be tested are identified. The step 22 of identifying risks typically comprises a meeting of subject matter experts and/or testers in which the process or system being tested is reviewed. During this step, the overall process is typically broken down into steps or sub-processes according to function. The testing group is separated into functional teams to address the sub-processes. Experts from each functional team analyze the process steps related to a particular area.

Each team reviews the process and records the risks involved in implementing the process steps. The risks may be referred to as failure modes. In the example of processing an insurance application, failure modes might include, for example, the submission of an incorrect application form, or attaching medical lab results to the wrong case. As another example, a failure mode for a manufacturing process might be the selection of a material of insufficient strength, or building a product component to an incorrect size. Potential failure modes for a medical procedure might include using the wrong clamp and causing tissue damage. Risks are then recorded in a risk spreadsheet, such as that shown in FIG. 2.

Once the functional teams have completed the task of identifying risks, the functional teams may convene to collectively review the identified risks. This method allows for identification and recording of cross-functional risks and the identification of additional risks. Other teams, such as legal, compliance, marketing, and sales teams, for example, may be utilized to review the identified risks and to identify any other risks as needed.

Figures 2, 3:
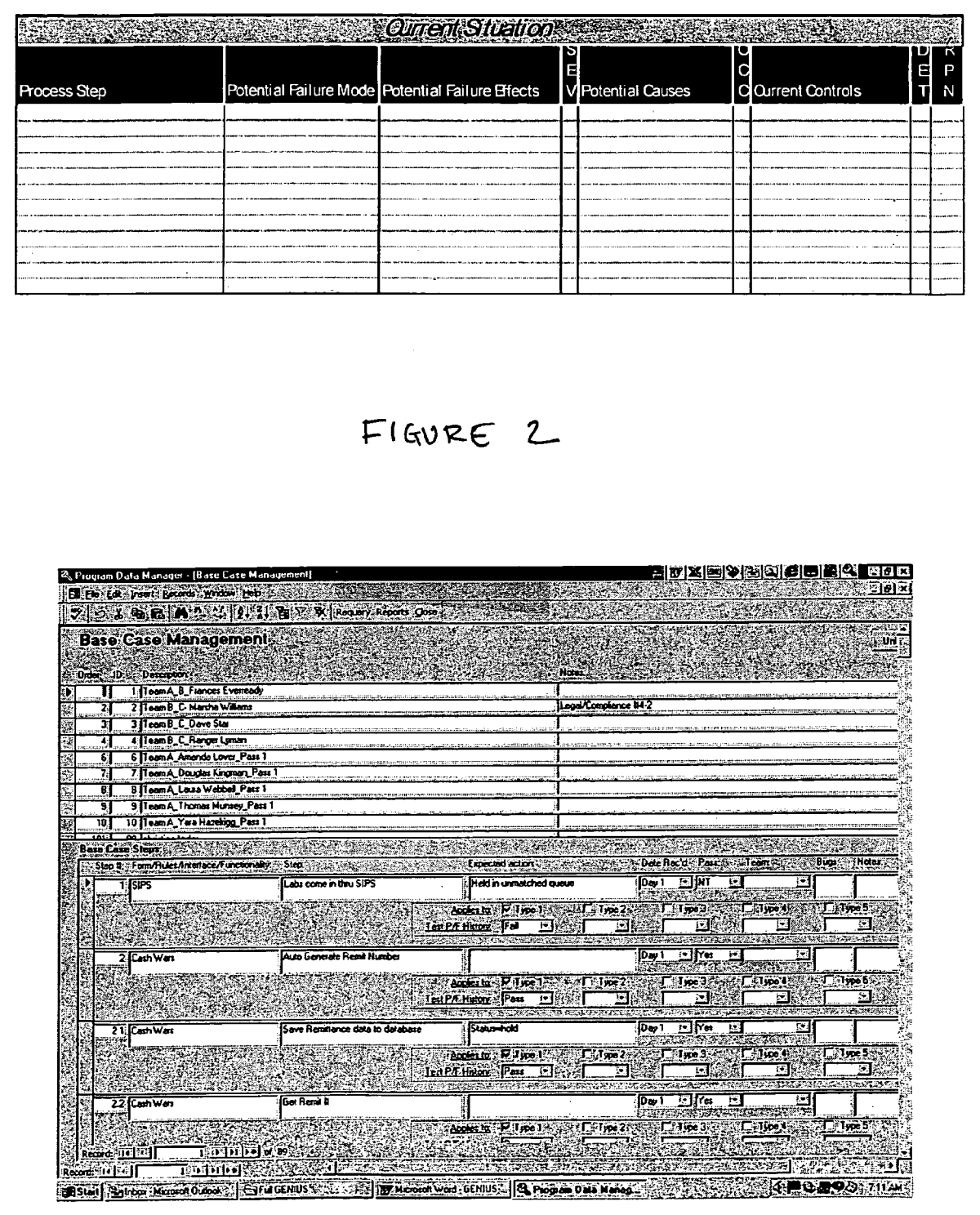

Once the risks have been identified, they are categorized in step 24. The magnitude of each risk is rated. One method for rating the risk is failure modes effect analysis (FMEA). According to FMEA, ratings are assigned to risks on a numerical scale, e.g., 1–9, based on: (1) the likelihood of the failure occurring, (2) the severity of the effect on the process being tested, and (3) the likelihood that the failure would be detected before it impacted another part of the process. These factors are multiplied together to calculate a risk value that may be referred to as a risk priority number (RPN). Referring to FIG. 2, the likelihood of failure occurring is entered in the column entitled OCC, the severity of the effect on the process is entered in the column entitled SEV, and the likelihood that the failure would be detected is entered in the column entitled DET. Although FMEA provides a suitable method for rating each identified risk, other methods of rating the identified risks can be used as well. For example, a cost, a complexity of implementation, and/or a level of manual intervention required to mitigate risk can be used, either alone or in combination, as methods of rating the identified risks. During this step 24, duplicate risks can be eliminated and similar risks can be combined, as needed.

In step 26, the risks are grouped according to risk value, e.g., according to RPN. The grouping of risks by risk value identifies which parts of the process or system being tested are likely to have the greatest impact on success or failure. The grouping also provides information to the test teams regarding the most beneficial areas on which to concentrate testing resources, as opposed to using a process functionality approach that gives an equal focus to each step in the process being tested. By focusing on risk, testing resources can be effectively utilized.

In step 28, one or more test cases are defined based on the risks that have been identified. The risks can be compiled into a risk pool, for example, which may comprise a matrix that lists the risks along the x-axis and the test cases along the y-axis. Each test case can be designed to test one risk or multiple risks. For example, testers and subject matter experts can work together to identify test cases that test multiple risks that occur at sequential steps in the process. In this way, the number of test cases needed to test all the identified risks in the process can be reduced as compared with the situation where each test case has a single associated risk. By utilizing end-to-end testing, the number of test cases to address the risks in the risk pool can be reduced significantly. In one example conducted by the inventors, a risk pool of over 1500 risks was effectively tested with less then 500 test cases.

In step 30, the test plan is documented. As test cases are identified, the plan for processing the test cases is recorded. Each test case is typically defined by a series of steps required to process the test case from start to finish. The steps may include, for example, data changes, forced errors (such as turning off a computer in the middle of making a change), and expected results. Documenting the test plan can provide the advantage that the risks associated with a particular test case are tested consistently each time the test case is executed. This test method also provides the data which forms the basis for the regression test bed once the process is in production, as well as a detailed audit tool to show how the test cases were conducted.

The test software may include a module to facilitate recording pertinent data on the test cases. The test case data may be stored in a database, such as the database 174 shown in FIG. 12. An example of a portion of a user interface for such a program is illustrated in FIG. 3. The user interface includes a number of fields for entering data on test cases. A number of test cases are listed at the top of the screen in FIG. 3. In the example of an insurance application process, the test cases are hypothetical people with defined physical characteristics applying for an insurance policy. The user interface contains additional fields for entering data on individual steps in each test case. In FIG. 3, the first few steps of test case 1 are shown on the bottom of the user interface screen. For each step of the test case, the user interface includes fields for a step number, a categorization of the step (e.g., a form, a rule, an interface, or a functionality), a textual description of the step, an expected action, an actual result (e.g., pass/fail), a designated team, and an identification of bugs. A field (not shown in FIG. 3) may also be provided to identify a particular risk that is associated with the step. In this way, the identified risks can be associated with particular steps in each test case, and vice versa. Each identified risk can also be associated with a particular test case generally.

The data entered into the user interface of FIG. 3 can be stored in a database such as the database 174 associated with the test software server 172. The test cases used with the test system 110 are generally the same as the test cases used with the model system 130. The test cases are stored in the database 174 for tracking. For each test case, associated test steps are noted along with the conditions for success. As each step is passed, it can be flagged. Once all test steps have been passed, the test case can be passed. Although FIG. 3 shows one example of a method and interface to record and track test cases, other methods such as spreadsheets, may also be used.

Figures 4, 5:
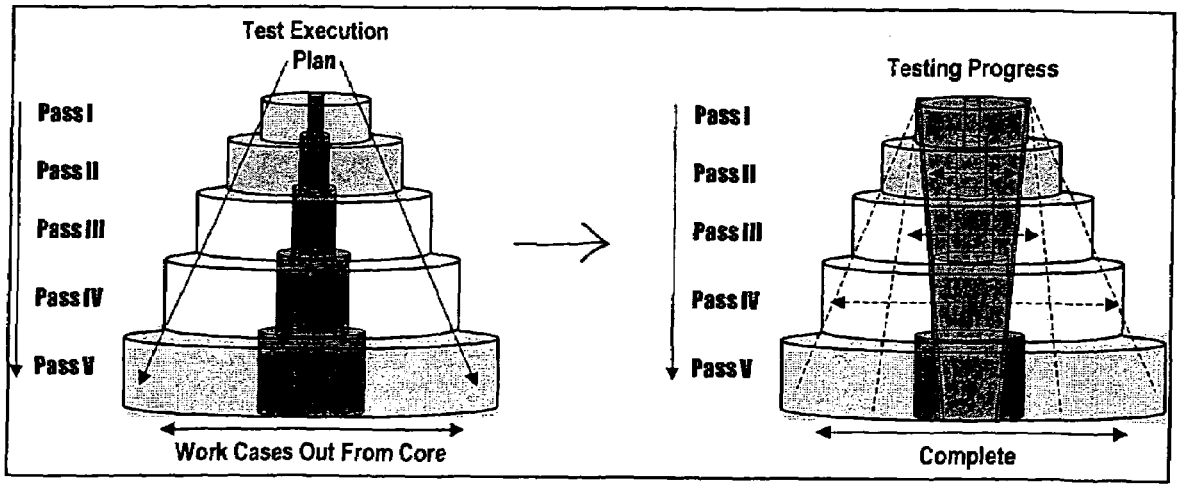
FIG. 4 is an example of a test case report that can be generated using test software.
FIG. 5 is a conceptual diagram of a testing execution method according to an exemplary embodiment of the invention.

The test software may allow a user to view test results, for example through an input/output device 176 such as a display or monitor. The test software can also be configured to generate, display, and print reports of the stored test case data in a desired format with desired fields. An example of such a report is shown in FIG. 4. The report of FIG. 4 lists a step number, a test step action, input data, a success condition, a test result (e.g., pass/fail), bugs related to the step, a tester, and notes.

At the conclusion of step 30, a test plan that focuses on core test cases and that also addresses risks of different levels of importance has been generated and documented. This test plan becomes the basis of the regression test bed for the process being tested. By focusing on a finite number of test cases to fully test the risks in the risk pool, it is possible to repeat the testing method with subsequent releases of the process and application software. By documenting and automating the testing method, any subsequent testing is executed consistently.

In step 32, with the test cases identified and documented, testers and subject matter experts may again convene to review the test cases for completeness and to verify that the risks of the process or system being tested have been adequately identified. At this time, the test cases are typically grouped according to the level of complexity of the test case. The complexity of a test case generally relates to the level of processing required to make a decision as to the disposition of the test case. For example, a test case defined as a hypothetical 25-year-old man who exercises regularly and does not smoke, drink alcohol, or have a family history of any diseases, would typically be considered a simple test case in an insurance application process. For such an individual, the insurance provider can predict low health risk without further inquiry. A complex case, on the other hand, might be presented by an older hypothetical person having both good and bad physical attributes. In that case, the insurance provider typically would need to undergo more complex fact finding and data processing to arrive at a disposition for the individual's insurance application.

FIG. 5 is a conceptual diagram illustrating an example of a method for executing a test plan in which a number of layers of complexity of the test cases are addressed in addition to a range of degrees of functionality of the process. In FIG. 5, five layers of test cases are shown, where the complexity of the test cases increases from the least complex top layer (Pass I) to the most complex bottom layer (Pass V). In FIG. 5, the degree of functionality of the process increases in each layer from the center vertical axis to the outer circumference.

In each layer, a subset of test cases is identified containing what may be referred to as "core" test cases. The core test cases are depicted in FIG. 5 as the dark shaded cylinders in the central portion of each layer. The core test cases are those test cases that test the basic functionalities of the process. The core test cases are tested first to verify that the basic functionalities of the process work correctly. After the testers verify that the process correctly handles the core test cases, then the additional degrees of functionality, represented by the regions outside the core, are tested.

With the test plan complete, another review may be conducted with team members and other personnel as needed. FIG. 1 depicts a "control point" 21 that represents such a review and an opportunity for the person responsible for the process to make a final approval of the test plan or to request modifications. After approval, the test execution phase 40 can begin. The test planning phase 20 is typically the most extensive phase in the risk based testing method.

In the test execution phase 40 the test cases are used as input conditions to the process or system being tested. The testing method begins with the delivery of a functional system or process and concludes when all test cases have been successfully executed or an acceptable level of risk has been attained, for example by execution of some portion of the test cases. Throughout testing, errors are reported and handled via a bug process, which tracks bugs through correction and retesting.

In step 42, the core test cases that test the basic functionality of the process or system are executed by a subset of the testing team according to the test plan. These test cases are identified as the core of the top layer of the conceptual diagram of FIG. 5 and are used to confirm that basic process functions operate correctly. Errors are reported, tracked, and corrected through the bug method, as will be described below. The testing of the core test cases is repeated with subsequent process or system corrections until all core test cases are handled correctly. At this point, the remaining higher degrees of functionality of the process in the top layer are tested. At the same time, the core test cases in the next layer down are tested.

The layer-by-layer testing method continues as testers move down the conceptual diagram of FIG. 5. As each test case is completed, the testers confirm that the associated risks have been mitigated or eliminated. The conceptual diagram of FIG. 5 illustrates an example of how the overall testing method may be conducted. The completely executed test plan will roughly resemble a pyramid or wedding cake, because all the functionality in each layer will have been tested. At the beginning of testing, the conceptual diagram of FIG. 5 will resemble an inverted pyramid, as shown on the right hand side of FIG. 5. The pyramid is inverted because the core test cases have been completed as well as some of the higher functionality test cases in the top few layers. As the higher functionality test cases are completed in each layer, the bases of each layer grow in size so that the conceptual diagram of FIG. 5 eventually resembles a non-inverted pyramid.

Throughout the test execution phase 40, reviews may be conducted to confirm which risks have been successfully tested, which have failed, and which risks remain. In some instances, the test team may conclude that an acceptable level of risk has been achieved before completing all the tests in the test plan. For example, after completing all the core test cases for each layer, and all the remaining higher functionality test cases in layers 1–3, the test team may conclude that risk has been sufficiently addressed for the process or system being tested. Typically, such a decision would mean that any remaining untested risks, or those that failed in testing, can be mitigated through existing processes. If the team concludes that it has reached an acceptable level of risk, it will document the untested and failed risks and associated mitigating factors or solutions for presentation to the business leadership. The business leadership will make the data-driven decision as to whether an acceptable level of risk as been reached, as described in the test signoff phase 60.

During the test execution phase 40, testers may find additional areas of risk which may become the subject of additional testing. As these additional risks are identified, they can be reviewed by the test team and process owners to decide whether additional test cases should be conducted. If so, additional test cases can be defined and added to the current list of test cases.

Figure 7:
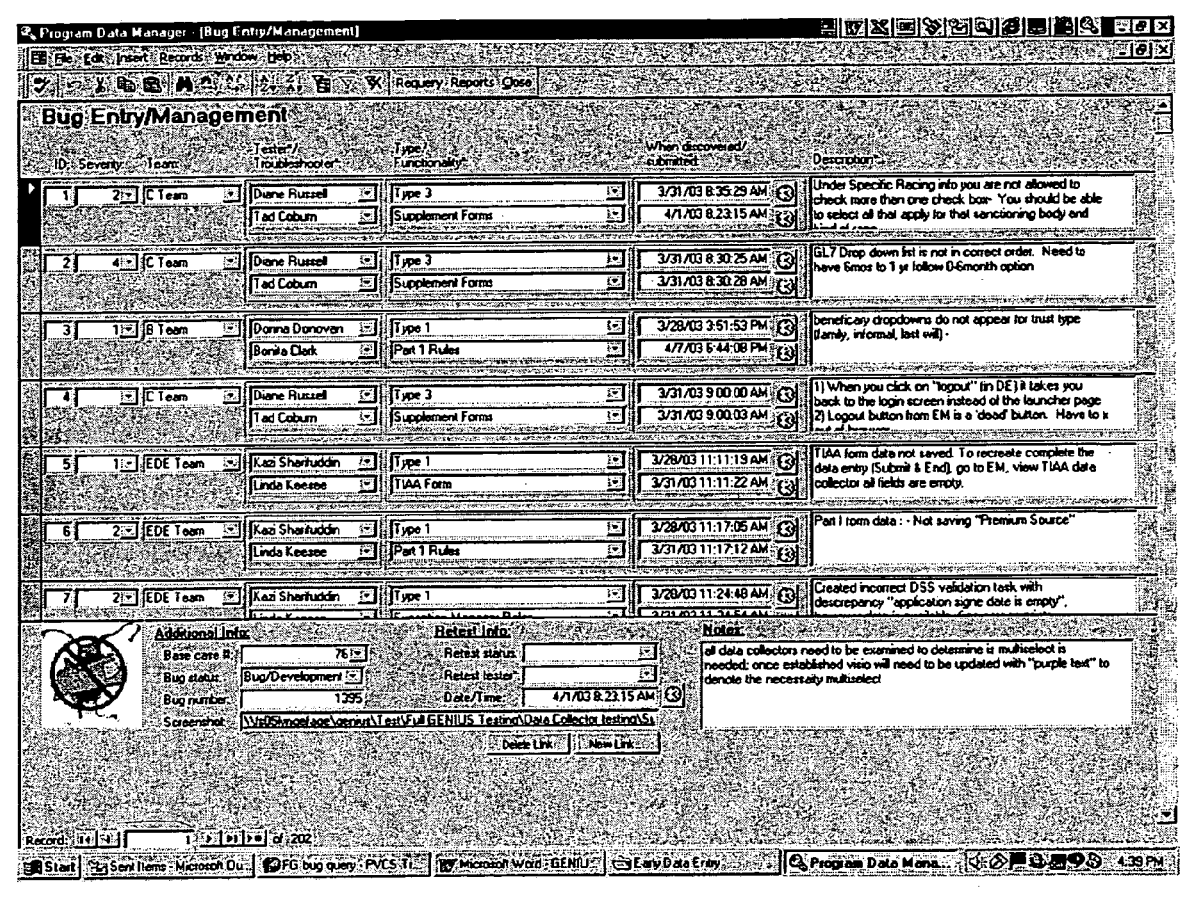

Step 44 is a step for handling errors or "bugs." As testers encounter errors in the process being tested, they record them for further review and may report them to a development team for correction as needed. An example of a method for tracking bugs through correction is shown in FIG. 6. The test software may include a module or bug tracking tool for logging and tracking bugs. Bugs can be reported by testers using the bug tracking tool. An example of a portion of a user interface for such a bug tracking tool is shown in FIG. 7. Typically, a detailed description of the bug is recorded as well as any supporting data such as screen images. As shown in FIG. 7, the user interface for the bug tracking tool may also include fields for a bug ID number, a severity level of the bug, an assigned team, a tester, a troubleshooter, a type, a functionality, and a date and time of discovery and submission.

Once entered, troubleshooters can review the bugs for discussion at a bug review meeting. The bug tracking tool tracks bugs to provide information as to which bugs have been corrected and which bugs require further work. Other software, such as PVCS Tracker or Bugzilla can be used as a bug tracking tool. Alternatively, a spreadsheet can be used. Once logged, the bug is routed to a troubleshooter, who confirms the problem and reconciles duplicate or redundant reports.

Periodically the test team, troubleshooters, and development representatives may meet to review reported bugs or errors. The bug review meeting may be conducted on a daily basis, for example. The bugs are discussed and prioritized for action based on severity level, which is typically based on production needs. The severity of bugs can be classified to promote consistency of handling bugs. The following classifications can be used, for example:

| Severity Classification | Explanation |
| --- | --- |
| Critical | The system/process cannot function. Major functionality is absent or flawed. No available workaround. |
| High | Problem imposes significant burden or impact on testing or end users. Substantial functionality is absent or flawed. May include data corruption or loss. Typically, a workaround exists. |

-continued

| Severity Classification | Explanation |
| --- | --- |
| Medium | Minor destructive errors encountered, or errors that block minor amounts of testing. Minor functionality is absent or flawed. |
| Low | Non-destructive errors or errors that do not block further testing. Minor functionality is absent or flawed. May include issues of appearance, such as incorrect fonts, colors, etc. |
| Enhancement | Resolution is not necessary for production. Can be addressed in later releases. |

Once the development team has completed and deployed an error correction, the troubleshooter is notified to perform a preliminary review and then the appropriate tester(s) are notified to retest the test case that caused the error. In some cases, for example where test case data has been corrupted, the data defining the test cases may need to be re-entered. Once retesting is successfully completed, the bug can be recorded in the bug tracking tool as "closed." Before moving the system/process to the production environment, a business review of any outstanding bugs, along with their associated workarounds and/or mitigating factors or solutions, is conducted to verify that the system/process requirements have been adequately addressed.

Referring again to FIG. 1, step 46 comprises planning for load testing. Load testing generally involves determining how many transactions or how much work the production system/process will be able to process in a given time period. Load testing typically includes one or more of mathematical calculation, statistical comparison, and repeated system/process execution that relate the performance of the model system 130 to the performance of the production system 150. Load testing may begin by determining the capabilities of the model system 130 and may end with a rating of the performance of the model system 130 and a projection of the capability of the production system 150.

Load testing using a model system can be beneficial because the cost of providing a duplicate production system dedicated solely to testing is often prohibitive. By extrapolating model system performance to the production system, it is usually possible to determine production system/process capacity with an acceptable level of confidence. Load testing is also beneficial because it illuminates the desired production system capabilities without negatively impacting the business operation or current users of the production system.

The step 46 of planning for load testing involves devising the procedures and tools used in load testing. The procedures and tools may include, for example, utilizing existing test cases, automated load testing, user load testing, robot automation tools, step testing, flow testing, performance monitoring tools, and system benchmarking. These procedures and tools will be described below.

Many of the test cases created in step 28 of the test planning phase 20 can be used to facilitate load testing through two load testing mechanisms: automated load testing (ALT) which is typically software driven, and user load testing (ULT) which may be performed by one or more users (e.g., testers). ALT can provide the advantage that a small group of testers can generate and conduct a large amount of test cases, due to automation. ALT may be conducted by programming a number of test cases into a robot automation tool as scripts. One suitable robot automation tool is QARun, available from Compuware, although other suitable robot automation tools can be used. In the case of ALT, the robot automation tool can enter a large number of test cases into the system.

ULT can provide the advantage of adding variation or customization to the test cases. ULT involves human testers executing test cases. ULT, however, may utilize some degree of automation using robot automation tools for some tasks, such as data entry. In addition, robot automation tools can be used in both ALT and ULT to record data such as transaction time or whether a step passes or fails. By using both ALT and ULT, a greater understanding of system/process performance characteristics can be established quickly and with efficient use of resources. Using the test cases that have been previously established can provide the advantage that load testing represents actual work that the system or process would perform.

The step 46 of planning for load testing also typically involves devising a plan for utilizing step testing and flow testing. Step testing generally relates to testing a particular step or sub-process in the overall process. Step testing is carried out by creating "roadblocks" between the different steps of a process. The roadblocks hold back the test cases at a particular step in the process until a predetermined number of test cases are ready to begin the next step of the process. When those test cases are allowed to proceed to the next step by removing the roadblock, a high volume of transactions or work is created. The volume may be significantly higher than that which is possible using other testing methods. Step testing can also provide the advantage that it can be performed at an earlier stage in testing when only certain portions of the model system/process are operational.

Flow testing generally relates to devising or using test cases that test a number of sequential sub-processes or steps in the overall process being tested. Flow testing tests the end-to-end performance of the production system or process. The step 46 of planning load testing typically involves selection of one or more test cases for flow testing that test the end-to-end performance of the system.

FIG. 9 is a diagram that shows a typical progression of step testing and flow testing. Initially, when only some steps in the process are operational, step testing is used, as shown in the top portion of FIG. 9. When the process being tested is nearing the production stage, flow testing can be added, as shown in the bottom portion of FIG. 9. At this point, step testing may also be carried out in a manner to simultaneously input multiple test cases to the system to test its capacity for handling large volumes of transactions. In both step testing and flow testing, ALT and ULT can be used.

The step 46 of planning load testing also typically involves planning for the utilization of performance monitoring tools. Performance monitoring tools may include, for example, BMC Patrol for hardware and software resource utilization, Oracle's management tools for identifying the impact of load on the system database, and IBM's MQ series management suite to analyze the performance of workflow software. To identify technology or process issues created by load, the process steps are mapped to the particular technology components of the model or production system used in each step of the process. One or more performance monitoring tools can then be selected to monitor the performance of each technology component of the model system 130 or production system 150.

The step 46 of planning load testing also typically comprises system benchmarking to determine the theoretical performance of a given computer system. For example, SpecINT benchmarking software can be used to extrapolate the performance differences between a model system 130 and a production system 150. FIG. 8 is a chart that shows a comparison of the model system performance with the production system performance, including SpecINT ratings in the column labeled INT (integer) and FP (floating point). FIG. 8 lists three server roles (Server role 1, 2, 3), each of which typically handles a particular function in the process being tested. Within each server role, data is listed for both the model system and the production system. The column "Int" lists the SpecINT processing capacity for integer operations. The column FP lists the SpecINT processing capacity for floating point operations. The row entitled "Difference" is the total SpecINT rating of the production system servers divided by the total SpecINT rating of the model system servers (e.g., for server role 1, 7360/740=9.95). This value indicates the relative processing power of the production system compared to the model system for either integer operations or floating point operations and is used to estimate production system performance based on model system performance observed during the various load tests on the model system 130.

The step 46 of planning load testing typically concludes by documenting the procedures and tools to be used in load testing, including, for example, the selected test cases, automated load testing, user load testing, robot automation tools, step testing, flow testing, performance monitoring tools, and system benchmarking tools.

Referring again to FIG. 1, the step 48 of executing load testing comprises executing the load test plan devised in step 46. Typically, the model system 130 is initially tested with a limited level of load to identify, for example, the largest bottlenecks. ALT can be used to provide the first pass of load testing because it reduces the amount of people needed for testing. The robot automation tools can be executed from several different machines, if desired. The robot automation tools may be used to conduct both step testing and flow testing. The data gathered by the performance monitoring tools can then be analyzed to identify performance issues with increased load and to identify areas in which further analysis of the process or system being tested may be beneficial or necessary. The output data from ALT may identify database and/or workflow issues that can then be corrected prior to ULT. Output from the load testing may include, for example, the time period needed to execute a particular transaction, and/or a success rate for the particular step being tested. The BMC Patrol software can be used to output the degree of utilization of the CPU in a particular server system.

Initially, step testing is used to demonstrate that the system or process is stable under a significant load. Step testing uses roadblocks between process steps to prevent cases from flowing through the system. After the desired number of test cases have been entered into the system, the roadblocks are removed causing the accumulated workload to quickly load the test system 130. Step testing illuminates capacity problems within a process step and identifies the maximum capacity of specific components. Step testing can also be integrated with ULT to add variation while the cases are processed.

As the process being tested approaches production-level capability, flow testing is used to demonstrate that a desired amount of work can flow through the system. Flow testing may be conducted with ALT and ULT. In ULT a number of testers can be scheduled to simultaneously access the system or process. The robot automation tools used in ALT can also be used to prepare a series of test cases that the testers will use to test the process. ULT scripts are scripts written for the users that are designed to step the users through what activities they will perform. During the ULT the users follow the ULT scripts while the test coordinators confirm that all errors are identified. The robot automation tools can be used to continuously capture transaction time and success rates (pass/fail) for process steps during both ALT and ULT.

In FIG. 1, step 50 involves extrapolating the capacity of the model system 130 to predict the capacity of the production system 150. During execution of load testing (step 48) the performance of components of the model system 130 is typically measured. Because load testing is usually performed on the model system 130 rather than the production system 150, the following calculations can be used to compare the performance of components of the model system 130 to the capability of the production system 150. To increase the likelihood that the production system 150 will meet the actual processing needs, it's "Production Capability" is typically reduced by about 15–20% (due to the higher number of systems in production each having its own operating system and overhead).

The production capability, PC, of the production system 150 can be estimated with the following equations:

$$INTmodel * UTIL/TRANS = LPT$$

$$INTproduction/LPT = PC$$

where INTmodel is the SpecINT rating of the model system 130, UTIL is the percent utilization of the processor, TRANS is the number of transactions per second, LPT is the load per transaction, INTproduction is the SpecINT rating of the production system 150, and PC is the production capability of the production system 150. The SpecINT ratings are determined using the SpecINT software, or using published values. The percent utilization of the processor (UTIL) can be generated by a suitable performance monitoring tool such as BMC Patrol.

The number of transaction per second (TRANS) can be calculated, for example, by analyzing the data generated by an application server. An example calculation is illustrated in FIG. 10. The application server records start (Start) and end (End) times for transactions, and records the data in system logs (referred to as log.3, log.2, log.1, and log in FIG. 10). In FIG. 10, the number of transactions (under the heading "Forms") is divided by the elapsed time in minutes (Elapsed) to calculate transactions per minute (Per minute) for a model system. This number can be scaled for transactions per second (TRANS) by dividing by 60.

FIG. 11 illustrates an example of an extrapolation calculation. In FIG. 11, various transactions, and the expected number of transactions per day, are listed in columns 1 and 2. The actual model performance (seconds per transaction) is listed in column 3, and the total time in seconds for those transactions on the model system 130 is listed in column 4. The relative processing power of the production system compared to the model system is listed in column 5. In this example, the value is 9.95, which is based on SpecINT ratings for integer operations. The value of 9.95 is shown in FIG. 8 as the relative processing power of the production servers (nm01 and nm02) as compared to the model server (nm03) for integer operations using server role 1. Column 6 in FIG. 11 lists an overhead factor based on the extra processing required for multiple operating systems and software. A 20% factor was used based on a number of servers operating in parallel which reduces efficiency. The values in columns 5 and 6 are used to obtain expected production performance (column 7) from actual model performance (column 4). The actual model performance (column 4) is divided by relative processing power (column 5) discounted by the overhead (column 6) to get the expected production performance (column 7). The actual production system performance appears in columns 8 and 9. The total hours predicted using this extrapolation method for the production system (42.93) is very close to the actual hours (41.17).

During the load testing, it is possible that bugs may be found in the application software that need correction. In such case, step 52 is executed in which bugs discovered during load testing are corrected. Identification and correction of bugs may be conducted in essentially the same manner as step 44. After correction of bugs, load testing is re-executed in step 48.

Once the production system 150 is operational, performance monitoring tool metrics can also be used to track actual performance during additional changes. Load testing and measuring performance can also be used to verify that code changes throughout the development life cycle improve operation of the production system 150.

Once the test execution phase 40 has been completed, e.g., based on risk reviews held with the business leaders and process owners, the test signoff phase 60 may begin. Step 62, test case signoff, involves review of the overall testing method with business leaders and process owners, and obtaining their approval that the model system or process have been satisfactorily tested and are ready for production implementation.

The test signoff review is preferably a data-driven process, as indicated at step 64 in FIG. 1. In step 64, the test team typically provides a comprehensive review of the testing performed, along with mitigating factors or solutions for risks that failed testing and any remaining untested risks. Elements of the review typically include the following: (1) a high-level map of the system or process flow; (2) the top-level business requirements and how they correlate to the developed system or process; (3) an overview of the implementation risks as developed during test planning, including an explanation of how the risks were stratified and examples of key risks in each strata; (4) an outline of the various testing approaches taken and how they were used (end-to-end testing, load testing, etc.); (5) the testing results achieved, including a review of the risks passed, failed, and those remaining as untested; (6) a discussion of the mitigating factors or solutions for controlling those risks that have not been successfully tested; and (7) a review of the steps required to move to production, along with timing and resource needs.

After reviewing the data presented by the test team, the business leaders and process owners give their approval to move to production, or provide guidance as to the next steps in order to obtain approval. If approved, the test and development teams execute the steps identified in (7) above in accordance with the respective business's change control processes.

One advantage of following the test method described herein is the creation of comprehensive documentation of the test cases and test methods used. This can be beneficial in system or process audits that may be conducted subsequently. The test cases can be used to form the initial regression test bed for the system or process being tested. Using automated tools to facilitate the processing of test cases provides repeatability of the test cases as well as a regression model to test future changes. The test software provides a number of capabilities, including: (a) storage of data relating to the risks associated with the process; (b) storage of the risk value (or RPN) as assigned to each risk; (c) generation of reports listing the risks in order of risk value to enable the tester(s) to confirm risks are effectively addressed by the system or process; (d) storage of test plans and their associated test steps that can be tied to the risks to ensure all risks are being addressed through the test cases; (e) reports on which test cases have been passed/failed which in turn show the risks passed/failed; and (f) storage and tracking of bugs found during testing. The test software may be in the form of a computer usable medium having computer readable program code means embodied therein for causing a computer to execute the methods described herein relating to testing a system or a process.

Risk based testing can provide a more effective alternative to traditional testing models based on system or process functionality and load. Test execution based on the risk-based testing according to the conceptual diagram of FIG. 5, can significantly reduce overall test time as compared with known testing methods. Typically, known testing methods require at least as much time to complete as the overall development time for the system. According to exemplary embodiments of the invention, risk based testing can reduce testing time by a significant amount as compared with known testing methods. In addition, the risk based testing method can achieve comprehensive testing of the model system that closely emulated actual production use of the system, thereby testing how the system or process would perform in actual production system conditions.

While the foregoing specification illustrates and describes the preferred embodiments of this invention, it is to be understood that the invention is not limited to the precise construction disclosed herein. The invention can be embodied in other specific forms without departing from the spirit or attributes. Accordingly, reference should be made to the following claims, rather than to the foregoing specification, as indicating the scope of the invention.

What is claimed is:

1. A method of testing comprising:
defining a process to be tested;
identifying a plurality of risks associated with the process;
quantifying each of the risks with a risk value;
defining a test plan for the process, the test plan including a number of test cases, wherein testing of the test cases is prioritized based on the risk value; and
executing the test plan.

2. The method of claim 1, wherein the process is executed at least in part by an automated system.

3. The method of claim 1, further comprising:
identifying at least one failure of the process based on executing the test plan; and
modifying the process based on the at least one failure.

4. The method of claim 3, wherein the step of quantifying each of the risks with a risk value comprises:
assigning a value for (1) the likelihood of the failure occurring, (2) the severity of the effect of the failure on the process being tested, and (3) the likelihood that the failure would be detected before it impacted another part of the process; and
multiplying the values together to calculate the risk value.

5. The method of claim 1, wherein each of the test cases comprises a set of conditions.

6. The method of claim 5, wherein each of the test cases represents a hypothetical person having various physical attributes, and the process comprises an insurance application process.

7. The method of claim 1, wherein a portion of the risks relate to errors in an insurance application process.

8. The method of claim 1, further comprising the step of categorizing the test cases based on a relative complexity of the test cases.

9. The method of claim 1, further comprising identifying at least one core test case, the core test case comprising conditions that test basic functionality of the process.

10. The method of claim 1, wherein the test cases are defined, in part, by forming a matrix with test cases listed along is first axis and risks listed along a second axis.

11. The method of claim 1, further comprising designing at least a portion of the test cases to each test a plurality of risks so as to reduce the number of test cases needed to test all of the risks.

12. The method of claim 1, further comprising recording the definition of each test case to enable the testing of the test cases to be reproduced at a later time.

13. The method of claim 1, further comprising:
executing a first set of test cases on a first version of the process, the first set of test cases testing a basic functionality of the first version of the process; and thereafter
simultaneously (a) executing a second set of test cases on the tint version of the process, the second set of test cases testing additional functionality of the process, and (b) executing a first set of test cases on a second version of the process, the first set of test cases testing a basic functionality of the second version of the process.

14. The method of claim 1, further comprising recording errors in the process in a standardized format.

15. The method of claim 1, further comprising correcting the errors in an order based on a severity level of the errors.

16. The method of claim 1, wherein the step of executing the test plan comprises:
simultaneously testing a predetermined number of test cases on a model system to assess a capacity of the model system; and
estimating a capacity of a production system to handle a number of test cases based on the number of test cases tested in the model system and the relative capacity of the production system with respect to the model system.

17. The method of claim 1, further comprising simultaneously testing a single subprocess comprising a portion of process with a plurality of test cases.

18. The method of claim 1, further comprising flow testing a plurality of test cases through the entire process.

19. A method of testing comprising:
defining a system to be tested;
identifying a plurality of risks associated with the system;
quantifying each of the risks with a risk value;
defining a test plan for the system, the test plan including a number of test cases, wherein testing of the test cases is prioritized based on the risk value; and
executing the test plan.

20. The method of claim 19, wherein the step of quantifying each of the risks with a risk value comprises:
assigning a value for (1) the likelihood of the failure occurring, (2) the severity of the effect of the failure on the system being tested, and (3) the likelihood that the failure would be detected before it impacted another pan of the system; and
multiplying the values together to calculate the risk value.

21. The method of claim 19, wherein each of the test cases comprises a set of conditions.

22. The method of claim 19, wherein each of the test cases represents a hypothetical person having various physical attributes, and the system comprises an insurance application system.

23. The method of claim 19, wherein a portion of the risks relate to errors in an insurance application system.

24. The method of claim 19, further comprising the step of categorizing the test cases based on a relative complexity of the test cases.

25. The method of claim 19, further comprising identifying at least one core test case, the core test case comprising conditions that test basic functionality of the system.

26. The method of claim 19, wherein the test cases are defined, in part, by forming a matrix with test cases listed along a first axis and risks listed along a second axis.

27. The method of claim 19, further comprising designing at least a portion of the test cases to each test a plurality of risks so as to reduce the number of test cases needed to test all of the risks.

28. The method of claim 19, further comprising recording the definition of each test case to enable the testing of the test cases to be reproduced at a later time.

29. The method of claim 19, further comprising:
executing a, first set of test cases on a first version of the system, the first set of test cases testing a basic functionality of the first version of the system; and thereafter
simultaneously (a) executing a second set of test cases on the first version of the system, the second set of test cases testing additional functionality of the system, and (b) executing a first set of test cases on a second version of the system, the first set of test cases testing a basic functionality of the second version of the system.

30. The method of claim 19, further comprising recording errors in the system in a standardized format.

31. The method of claim 19, further comprising correcting the errors in an order based on a severity level of the errors.

32. An article of manufacture comprising:
a computer useable medium having computer readable program code means embodied therein for testing a process or a system, the computer readable program code means in said article of manufacture comprising:
computer readable program code means for causing the computer to receive and store data identifying a plurality of risks associated with the process or system;
computer readable program code means for causing the computer to receive and store a risk value associated with each of the plurality of risks;
computer readable program code means for causing the computer to receive and store data defining a test plan for the process or system, the test plan including at least one test case, the at least one test case comprising at least one step;
computer readable program code means for causing the computer to receive and store data associating each of the plurality of risks with a step of a test case; and
computer readable program code means for causing the computer to generate a report listing the risks in order of the risk value.

33. The article of claim 32, further comprising computer readable program code means for causing the computer to generate a report identifying a pass/fail status for each test case.

34. The article of claim 32, further comprising computer readable program code means for causing the computer to receive and store data identifying errors in the process or the system.

35. The article of claim 34, further comprising computer readable program code means for causing the computer to generate a report identifying a status of the errors.

* * * * *